Patented Apr. 10, 1923.

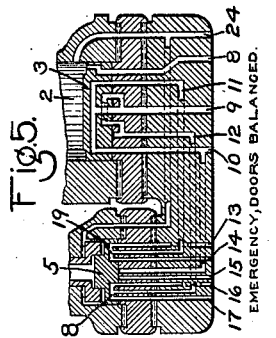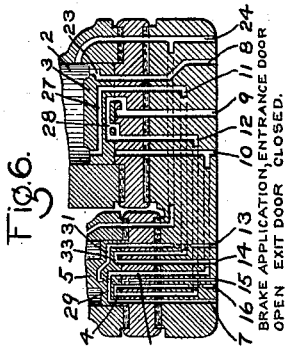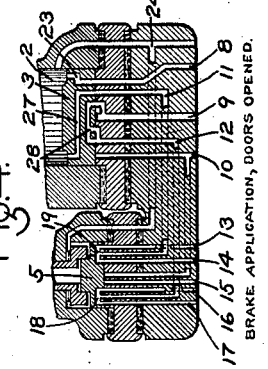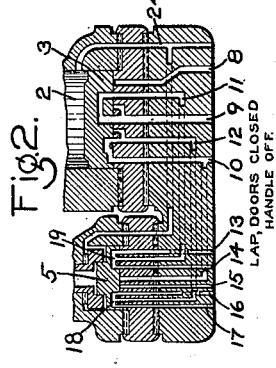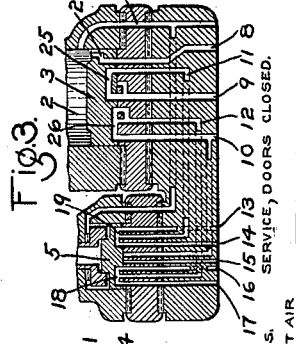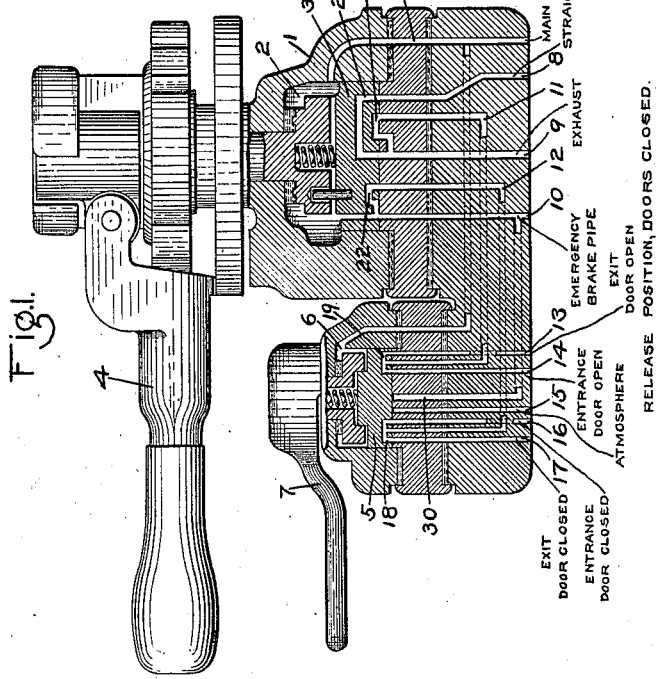

1,451,441

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

CAR-DOOR-CONTROL DEVICE.

Application filed March 24, 1922. Serial No. 546,524.

*To all whom it may concern:*

Be it known that I, CLYDE C. FARMER, a citizen of the United States, residing at Pittsburgh, in the county of Allegheny and State of Pennsylvania, have invented new and useful Improvements in Car-Door-Control Devices, of which the following is a specification.

This invention relates to car door controlling devices, and more particularly to means for controlling a plurality of car doors.

Particularly on cars employed in electric traction service, a plurality of car doors are provided, such as an exit and an entrance door, and under varying conditions of service, there are times when it is desirable that only one of the doors shall be opened and other times when both doors may be opened.

The principal object of my invention is to provide means for selectively operating the car doors, so that at one time both doors may be operated simultaneously and at another time either one of the doors may be opened while the other door remains closed.

Other objects and advantages will appear in the following more detailed description of the invention.

In the accompanying drawing; Fig. 1 is a sectional view of a combined brake valve and door selector device embodying my invention, showing the brake valve in release position and the door selector in the position for operating both doors; Figs. 2, 3, and 4, sectional views of the combined brake valve and door selector device, showing the door selector in the position for controlling both doors and the brake valve in the respective positions of lap with doors closed, service application with doors closed, and brakes applied with the doors open; Fig. 5 a similar view, showing the brake valve in emergency application position; Fig. 6 a similar view, showing the door selector in the position for operating the entrance door and the brake valve in brake applied position; and Fig. 7 a similar view, showing the door selector in the position for operating the entrance door, with the brake valve in the brake applied position.

As shown in the drawing, the fluid pressure brake valve device may comprise a casing 1 having a valve chamber 2 containing a rotary slide valve 3 adapted to be operated by a handle 4. Associated with the brake valve device is a door selector valve device comprising a rotary slide valve 5, contained in valve chamber 6, and adapted to be operated by a handle 7.

Leading to the seat of the valve 3 is passage 8, connected to the usual straight air pipe, exhaust passage 9, passage 10, connected to the usual emergency brake pipe, and passages 11 and 12, which lead to the seat of rotary valve 5. Leading to the seat of rotary valve 5 is passage 13, connected to the exit door opening pipe, passage 14, connected to the entrance door opening pipe, exhaust passage 15, passage 16, connected to the entrance door closing pipe, and passage 17, connected to the exit door closing pipe.

The door selector valve 5 has three positions, one in which connections are made for controlling both doors simultaneously, another in which only the exit door is operated, and a third in which only the entrance door is operated.

In operation, if it is desired to operate both doors simultaneously, the valve 5 is turned to the position shown in Fig. 1, in which a cavity 18 connects the door closing passages 16 and 17 with passage 12 and a cavity 19 connects the door opening passages 13 and 14 with passage 11.

It will be understood that a door engine is provided for controlling the entrance door and a door engine for controlling the exit door and that each door engine may be of the usual construction having connected pistons, the admission of fluid pressure to one piston being adapted to effect the opening of the car door and the admission of fluid pressure to the other piston being adapted to close the car door.

In the release position of the brake valve, the straight air pipe 8 is connected by cavity 20 with exhaust port 9, so that the brakes are released and passage 11 is connected by cavity 21 with exhaust passage 9, so that both of the door opening passages 13 and 14 are connected to the atmosphere. Passage 12 is connected by cavity 22 with the emergency brake pipe passage 10, so that fluid from the emergency brake pipe is supplied through passages 16 and 17 to the door closing pistons of both the entrance and the exit door controlling engines, thus causing the door engines to operate to close both doors.

If it is desired to apply the brakes and hold the car doors closed, the brake valve is turned to service position, as shown in Fig. 3, in which the straight air passage 8 is connected through port 23 with rotary valve chamber 2 and since said chamber is supplied with fluid under pressure through passage 24, fluid will be admitted to the straight air pipe to effect a straight air application of the brakes. In this position, a cavity 25 connects exhaust port 9 with passage 11 and cavity 26 connects the brake pipe passage 10 with passage 12, so that fluid under pressure is supplied to the door closing pistons of the door engines, while the door opening pistons are connected to the exhaust. The car doors are thus held closed, as in release position.

If it is desired to apply the brakes and open the car doors, the brake valve is turned to the position shown in Fig. 4, in which port 23 registers with straight air passage 8 so that fluid under pressure is supplied to effect an application of the brakes. A port 27 registers with passage 11, so that fluid under pressure is supplied through the door selector valve 5 to the door opening pistons of the door engines while passage 12 is connected through cavity 28 with exhaust passage 9 so that the door closing pistons of the door engines are connected to the atmosphere. The car doors will therefore be opened when the brakes are applied in this position.

If only the entrance door is to be operated, the door selector valve 5 is turned to the position shown in Fig. 6, in which the exit door closing passage 17 is connected through cavity 29 with passage 30 leading to the emergency brake pipe passage 10, while the exit door opening passage 13 is connected through cavity 31 with passage 15, leading to the atmosphere. Since fluid pressure is thus supplied to the door closing piston of the exit door engine, while the door opening piston is open to the atmosphere, the exit door will be held in the closed position, so long as the door selector valve remains in this position, and regardless of the movement of the brake valve.

If the brake valve is moved to brake application position in which the entrance car door is to be opened, the brake valve connections will be the same as shown in Fig. 4, in which fluid under pressure is supplied through port 23 to passage 8. In this position of the door selector valve, passage 11 is connected through cavity 33 with the entrance door open passage 14 while the entrance door closing passage 16 is connected through cavity 34 with passage 12 which is connected through cavity 28 in the valve 3 with exhaust passage 9. Fluid under pressure is thus supplied to the door opening piston of the entrance door engine to effect the opening of the entrance door. When the brake valve is turned to release position, the passage 11 is connected to the exhaust passage 9 while passage 12 is connected to the brake pipe passage 10, so that the door closing piston of the entrance door engine is supplied with fluid under pressure while the door opening piston is connected to the atmosphere and consequently the entrance door is moved to closed position.

If it is desired to operate only the exit door, the door selector valve 5 is turned to the position shown in Fig. 7, in which the entrance door opening passage 14 is connected through cavity 35 with exhaust passage 15 while the entrance door closing passage 16 is connected through cavity 36 with passage 30 leading to the brake pipe passage 10. Fluid under pressure will thus be supplied to the door closing piston of the entrance door engine while the door opening piston is connected to the atmosphere and therefore the entrance door will be held closed so long as the door selector valve remains in this position, regardless of the movement of the brake valve.

If it is desired to apply the brakes and open the exist door, the brake valve is turned to the position shown in Fig. 7 which is the same as the position shown in Fig. 4 and fluid under pressure is supplied to passage 11 and thence through cavity 37 to the exit door opening passage 13, while passage 12 is connected to the atmosphere, so that since the exit door closing passage 17 is connected through cavity 38 with passage 12, the door closing piston of the exit door engine will be subject to atmospheric pressure and the exit car door will be opened.

When the brake valve is turned to release position, the passage 11 is connected to the exhaust, while passage 12 is connected to the emergency brake pipe, so that fluid under pressure is supplied to the door closing piston of the exit door engine to effect the closing of the exit door.

It will be noted that fluid under pressure for operating the car door engines is supplied from the emergency brake pipe and since in an emergency application of the brakes, the emergency brake pipe is vented to the atmosphere, it will be clear that all pistons of the car door engines, which may be subject to fluid pressure at the time the emergency application is effected, will be vented to the atmosphere, regardless of the position of the door selector valve and since the pistons of each door engine are subject to atmospheric pressure, the fluid pressures will be balanced and the car doors may readily be opened manually.

Having now described my invention, what I claim as new and desire to secure by Letters Patent, is:—

1. In combination, a manually operated device for controlling a plurality of car doors and a door selector device for determining which car door shall be operated by the movement of the manually operated device.

2. The combination with a brake valve device having ports for controlling a plurality of car doors, of a selector valve device for controlling communication through which the car doors are controlled by said brake valve device.

3. The combination with a brake valve device having ports for controlling the fluid pressure for operating a plurality of car doors, of a selector valve device having a position in which communication is opened through which one car door is controlled by the brake valve device and communication is closed through which another car door is controlled.

4. The combination with a brake valve device having ports for controlling the fluid pressure for operating a plurality of car doors, of a selector valve device having a position in which communication is opened through which one car door is controlled by the brake valve device and communication is closed through which another car door is controlled, and another position in which communication is opened for controlling two car doors.

5. The combination with a brake valve device having ports for controlling the fluid pressure for operating a plurality of car doors, of a selector valve device having a position for controlling the fluid pressure for holding one car door closed and for opening communication through which another car door is controlled by said brake valve device.

6. The combination with a brake valve device having ports for controlling the fluid pressure for operating a plurality of car doors, of a selector valve device having a position for establishing communication through which two car doors are controlled by said brake valve device and other positions in which one car door is held closed while communication is opened through which another car door is controlled by manipulation of the brake valve device.

7. The combination with a brake valve device having ports for supplying fluid under pressure for opening and closing two car doors, of a selector valve device having a position in which communication is opened for controlling both doors by manipulation of the brake valve device, and other positions in which the selector valve device supplies fluid under pressure for holding one car door closed while establishing communication through which the other door is controlled by said brake valve device.

In testimony whereof I have hereunto set my hand.

CLYDE C. FARMER.